(12) United States Patent
Tian et al.

(10) Patent No.: US 7,844,018 B2
(45) Date of Patent: Nov. 30, 2010

(54) METHODS AND APPARATUSES FOR REDUCING INTER-CARRIER INTERFERENCE IN AN OFDM SYSTEM

(75) Inventors: Tao Tian, San Diego, CA (US); Raghuraman Krishnamoorthi, San Diego, CA (US); Krishna Kiran Mukkavilli, San Diego, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 11/674,632

(22) Filed: Feb. 13, 2007

(65) Prior Publication Data

US 2008/0159449 A1 Jul. 3, 2008

Related U.S. Application Data

(60) Provisional application No. 60/883,137, filed on Jan. 2, 2007.

(51) Int. Cl.
*H04L 25/08* (2006.01)
(52) U.S. Cl. ................. 375/346; 375/316; 329/318; 329/320; 329/349; 455/63.1; 455/278.1; 455/296
(58) Field of Classification Search .......... 375/346, 375/348, 316; 329/319, 320, 318, 349; 455/63.1, 455/278.1, 296
See application file for complete search history.

(56) References Cited

U.S. PATENT DOCUMENTS

| 6,639,454 | B2 | 10/2003 | Hoshi et al. | |
| 7,076,681 | B2 | 7/2006 | Bose et al. | |
| 2002/0146063 | A1* | 10/2002 | Gorokhov et al. | 375/148 |
| 2002/0191104 | A1 | 12/2002 | Matsutani et al. | |
| 2006/0165187 | A1* | 7/2006 | Troya et al. | 375/260 |
| 2006/0291375 | A1* | 12/2006 | Nishikawa | 370/210 |
| 2007/0004337 | A1* | 1/2007 | Biswas et al. | 455/63.1 |

FOREIGN PATENT DOCUMENTS

WO WO2004006525 1/2004

OTHER PUBLICATIONS

International Search Report and Written Opinion - PCT/US2007/089086, International Search Authority - European Patent Office - Aug. 7, 2008.
Jong-Ho Lee et al: "A residual frequency offset compensation scheme for OFDM system via SAGE algorithm" Vehicular Technology Conference, 2005. VTC-2005-Fall. 2005 IEEE 62nd Dallas, TX, USA Sep. 25-28, 2005, Piscataway, NJ, USA.IEEE, vol. 1, Sep. 28, 2005, pp. 573-577.
Mike Faulkner et al: "Low-Complex ICI Cancellation for Improving Doppler Performance in OFDM Systems" Vehicular Technology Conference, 2006. VTC-2006 Fall. 2006 IEEE 64th, IEEE, PI, Sep. 1, 2006, pp. 1-5.

(Continued)

*Primary Examiner*—Mohammad H Ghayour
*Assistant Examiner*—Leila Malek
(74) *Attorney, Agent, or Firm*—Gerald P. Joyce, III

(57) ABSTRACT

An OFDM telecommunications system includes a transmitter and a receiver. The receiver includes a canceller configured to reduce inter-carrier interference (ICI) in an OFDM symbol in the frequency domain.

21 Claims, 4 Drawing Sheets

OTHER PUBLICATIONS

Min Huang et al: "Iterative ICI cancellation algorithm for uplink OFDMA system with carrier-frequency offset" Vehicular Technology Conference, 2005. VTC-2005 Fall. 2005 IEEE 62nd Dallas, TX, USA Sep. 25-28, 2005, Piscataway, NJ, USA, IEEE, vol. 3, Sep. 25, 2005, pp. 1613-1617.

Yusek T et al: "ICI cancellation 'based channel estimation for OFDM systems" Radio and Wireless Conference, 2003. RAWCON '03. Proceedings Aug. 10-13, 2003, Piscataway, NJ, USA.IEEE, Aug. 10, 2003, pp. 111-114.

* cited by examiner

METHODS AND APPARATUSES FOR REDUCING INTER-CARRIER INTERFERENCE IN AN OFDM SYSTEM

CROSS-REFERENCE TO RELATED APPLICATIONS

This application claims priority to U.S. Provisional Application Ser. No. 60/883,137, filed on Jan. 2, 2007.

BACKGROUND

1. Field

The present disclosure relates generally to telecommunications, and more particularly, to various concepts for reducing inter-carrier interference (ICI) an OFDM system.

2. Background

In recent years, there has been an increased interest in multi-carrier telecommunication systems. One example is a telecommunication system using Orthogonal Frequency Division Multiplexing (OFDM) technology. OFDM is a multi-carrier modulation technique that effectively partitions the overall system bandwidth into multiple sub-carriers. Data is modulated onto each sub-carrier by adjusting the sub-carrier's phase, amplitude or both. Typically, quadrature phase shift keying (QPSK) or quadrature amplitude modulation (QAM) is used, but other modulation schemes may also be used. These sub-carriers are spaced apart at precise frequencies to provide orthogonality, thereby eliminating crosstalk between the sub-carriers. This reduces the complexity of both the transmitter and receiver by eliminating the need for separate filters for each sub-channel typically required in Frequency Division Multiplexing (FDM) systems. Instead, efficient modulation and demodulation techniques may be employed using a Fast Fourier Transform (FFT) algorithm, making it ideal for low cost wideband communications. Today, OFDM is used in many telecommunication systems including Qualcomm's MediaFLO, Wireless Local Area Networks (WLAN), such as IEEE 802.11a, 802.11g, 802.16 (Wi-Max), IEEE 802.20 (Mobile Broadband Wireless Access), etc., Ultra wideband (UWB) systems, and others.

OFDM relies heavily on the transmitted sub-carriers being aligned with the demodulating sub-carriers at the receiver. An error in the receiver master clock frequency may cause the spacing of the demodulating sub-carriers to differ from those transmitted, resulting in a loss of orthogonality and introducing inter-carrier interference (ICI). Various solutions have been proposed in the past for reducing ICI in multi-carrier telecommunication systems. These solutions generally involve complex techniques to derive an error signal from the received signal to drive an Automatic Frequency Control (AFC) loop or perform some type of digital resampling process. Accordingly, there is a need in the art for more efficient means for reducing ICI in the multi-carrier telecommunication systems.

SUMMARY

An aspect of a receiver is disclosed. The receiver includes a canceller configured to reduce inter-carrier interference (ICI) in an OFDM symbol in the frequency domain.

An aspect of an inter-carrier interference (ICI) canceller is disclosed. The ICI canceller includes means for receiving an OFDM symbol in the frequency domain, and means for reducing ICI in the OFDM symbol in the frequency domain.

An aspect of a method of receiving communications is disclosed. The method includes receiving an OFDM symbol in the frequency domain, and reducing inter-carrier interference (ICI) in the OFDM symbol in the frequency domain.

An aspect of computer readable media is disclosed. The computer readable media includes a set of instructions for a processor to cancel inter-carrier interference (ICI). The instructions include code to receive an OFDM symbol in the frequency domain, and code to reduce ICI in the OFDM symbol in the frequency domain.

An aspect of a computer program product is disclosed. The computer program product includes computer-readable medium. The computer readable medium including code to receive an OFDM symbol in the frequency domain, and code to reduce ICI in the OFDM symbol in the frequency domain.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
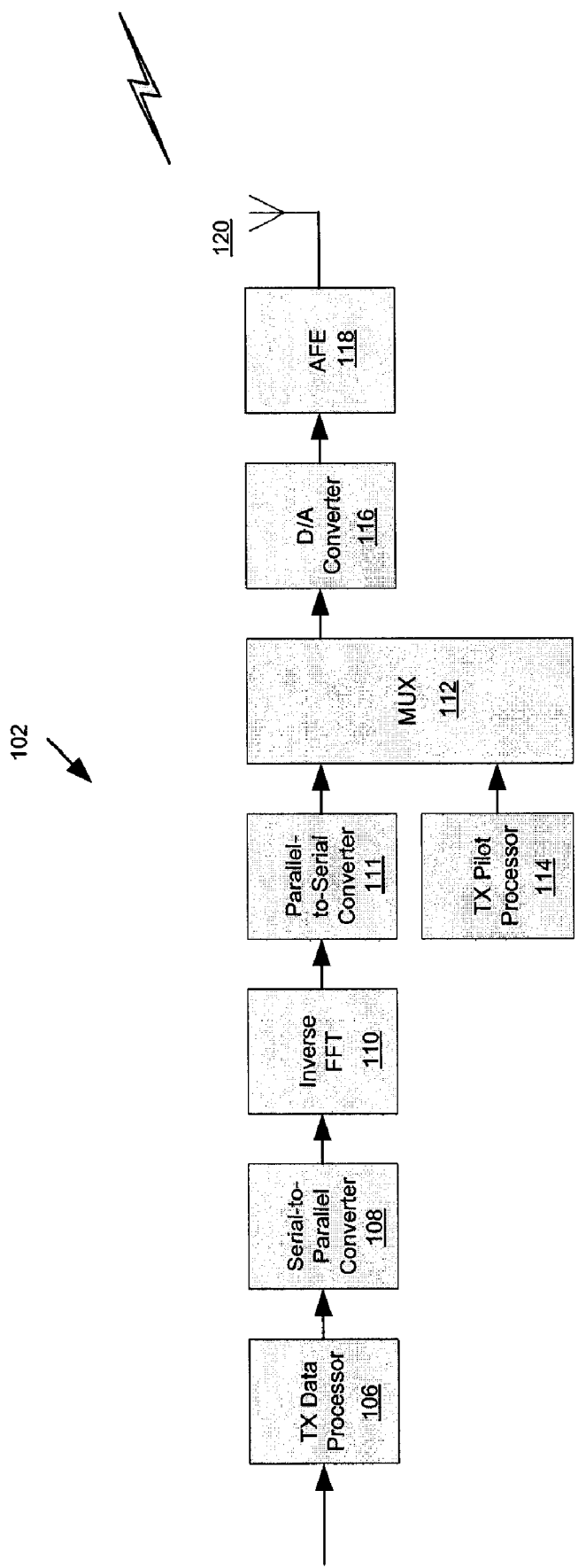
FIG. 1 is a high-level block diagram of a transmitter in a multi-carrier telecommunications system.
Figure 2:
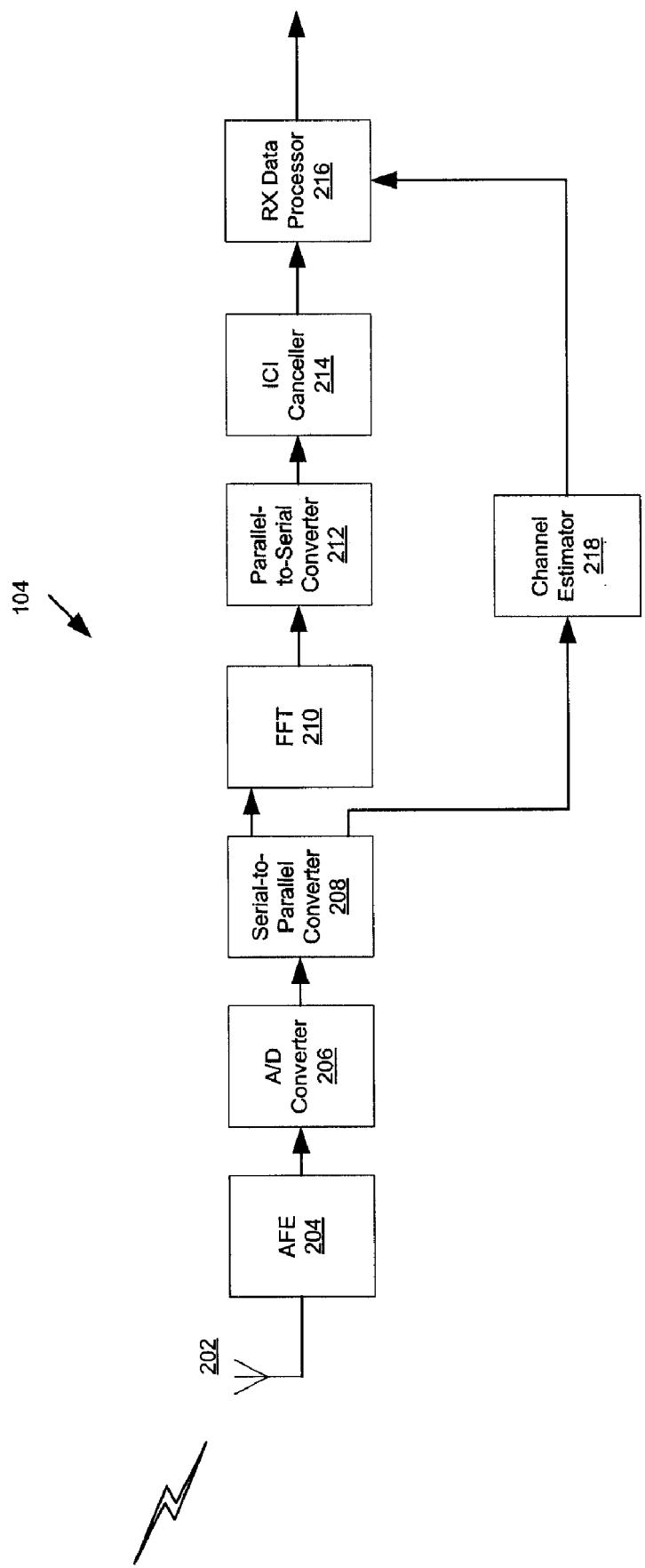
FIG. 2 is a high-level block diagram of a receiver in a multi-carrier telecommunications system.

FIGS. 1 and 2 are high-level block diagrams of a transmitter 102 and receiver 104 in a multi-carrier telecommunications system. The transmitter 102 may be part of a base station and the receiver 104 may be part of a access terminal. Conversely, the transmitter 102 may be part of an access terminal and the receiver 104 may be part of a base station. An access terminal may be any fixed or mobile radio device, such as a mobile telephone, a personal digital assistant (PDA), a personal or laptop computer, a television receiver, a game console, a camera, a MP3 player, or any other video, audio, or data device capable of radio communications. A base station may be a fixed or mobile transceiver that serves one or more access terminals in its geographic region. The base station may be used to provide multimedia broadcasts, enable access terminals to communicate with one another, or serve as a gateway to wired packet-based and/or circuit-switched networks.

Referring to FIG. 1, a transmit (TX) data processor 106 processes (e.g., encodes, interleaves, and symbol maps) data into a stream of data symbols. As used herein, a "data symbol" is a modulation symbol for data, and a "modulation symbol" is a complex value for a point in a signal constellation (e.g., for PSK or QAM).

The transmit (TX) data provides the data symbol stream to a serial-to-parallel converter 108. The serial-to-parallel converter 108 maps a data symbol to each of the N sub-carriers. Because the sub-carriers at the edges of the spectrum may impose severe constraints on transmit filtering required to meet regulatory spectral masks, the skilled artisan may chose not to send any data on those sub-carriers. Instead, the edges of the spectrum, referred to as "guard bands," may carry zero symbols and hence no energy.

The serial-to-parallel converter 108 provides a set of N symbols to an inverse FFT 110. The inverse FFT 110 is used to generate an OFDM symbol comprising N independently modulated sub-carriers in the time domain. A parallel-to-serial converter 111 is used to convert the time domain sub-carriers into a serial format for framing. A TX pilot processor 112 is used to generate a pilot signal comprising a number of pilot symbols. A multiplexer 114 may be used to frame the pilot signal from the TX pilot processor 110 with one or more OFDM symbols from the inverse FFT 110. Alternatively, the TX pilot processor 112 may be used to generate a pilot signal in the frequency domain by providing pilot symbols to the serial-to-parallel converter 108 for mapping to a portion of the N sub-carriers.

A digital-to-analog (D/A) converter 116 is used to convert the OFDM symbol stream to the analog domain. As used herein, an "OFDM symbol stream" means an OFDM symbol stream with or without a time domain pilot signal. The sum of the N orthogonal sub-carriers for each OFDM symbol is used to modulate a carrier frequency in an analog front end (AFE) 118 to generate a transmission signal. The transmission signal is transmitted by the AFE 118 over a radio channel through an antenna 120.

Referring to FIG. 2, an antenna 202 receives the transmitted signal and provides it to an AFE 204. The AFE 204 recovers the OFDM symbol stream from the carrier frequency and provides it to an analog-to-digital (A/D) converter 206. The A/D converter 206 is used to convert the OFDM symbol steam to the digital domain.

Each OFDM symbol is converted to a parallel format using a serial-to-parallel converter 208 before being provided to a FFT 210. The FFT 210 is used to convert the OFDM symbol stream back into the frequency domain. Specifically, the FFT 210 generates N independently modulated sub-carriers for each OFDM symbol. The N independently modulated sub-carriers are provided to a parallel-to-serial converter 212 to produce a stream of symbol estimates.

The symbol estimates output from the parallel-to-serial converter 212 may not correspond to the exact location of a point in the original signal constellation due to noise and other disturbances in the radio channel. A receive (RX) data processor 216 may be used to determine the data symbol in the signal constellation most likely transmitted for each non-zero symbol estimate. This determination is based on the data symbol estimate and the radio channel's impulse response provided by a channel estimator 218. The channel estimator 218 estimates the radio channel's impulse response from the time domain pilot signal in the OFDM symbol stream. The RX data processor 216 also provides other signal processing functions such as deinterleaving and decoding, to recover the original data.

The receiver 104 may also include an ICI canceller 214. In the example shown in FIG. 2, the ICI canceller 214 is placed between the parallel-to-serial converter 212 and the RX data processor 214, but may be used elsewhere in the receiver 104. The ICI canceller 214 provides a means for reducing ICI resulting from sampling clock error at the receiver. The manner in which the ICI canceller 214 performs this functions is best understood with reference to the following mathematical analysis.

The baseband model of the transmitted signal s(t) can be expressed as:

$$s(t) = \sum_{k=0}^{N-1} e^{j\frac{2\pi}{T_u}(k-\frac{N}{2})t} b_k, \quad 0 \le t \le T_u + T_g, \quad (1)$$

where:
N is the size of the transmitter IFFT (assumed to be the same as receiver FFT),
$T_u$ is the useful OFDM symbol time;
$T_g$ is the guard band time;
$b_k$ is the transmitted data/pilot/zero symbol on sub-carrier k;
N/2 is used to represent centering the carriers around DC, which corresponds to the carrier index and the physical location of the downconverted signal at baseband.

Assuming an ideal receiver with no local oscillator (LO) noise, and assuming the guard band of the OFDM symbol is sufficiently long, the received signal y(t) is affected only by the radio channel's impulse response $H_k$. The received signal can be expressed as:

$$y(t) = \sum_{k=0}^{N-1} e^{j\frac{2\pi}{T_U}(k-\frac{N}{2})t} b_k H_k, \quad (2)$$

where $H_k$ is the complex impulse response of the radio channel at the frequency of the $k^{th}$ carrier. Replacing $b_k H_k$ with $R_k$, the received signal becomes:

$$y(t) = \sum_{k=0}^{N-1} e^{j\frac{2\pi}{T_U}(k-\frac{N}{2})t} R_k. \quad (3)$$

At the receiver, the received signal y(t) is correlated with each of the possible sub-carrier waveforms to recover $R_k$ (i.e., the received modulation symbol on sub-carrier k). However, the sub-carrier waveforms (demodulating sub-carriers) may be subject to a sampling frequency error which causes the spacing of the demodulating sub-carriers to differ from those transmitted. The sampling frequency error $$\frac{f_s}{f_s'}$$

may be expressed as (1+ε), where $f_s$ (the transmitter master clock frequency) is equal to $$\frac{N}{T_u}.$$

Also, note that $f'_s$ here refers to the receiver master clock frequency. Taking into consideration the frequency sampling error, the received signal can be expressed as follows:

$$y_n = \sum_{k=0}^{N-1} e^{j\frac{2\pi}{T_u}(k-\frac{N}{2})n(1+\varepsilon)\frac{T_u}{N}} R_k \quad (4).$$

$$= \sum_{k=0}^{N-1} e^{j\frac{2\pi}{N}(k-\frac{N}{2})n(1+\varepsilon)} R_k.$$

Using an FFT, the samples $y_n$ are correlated with the demodulating sub-carriers to obtain the following result for the $l^{th}$ sub-carrier:

$$Y_l = \sum_{n=0}^{N-1} e^{j\pi n} e^{-j\frac{2\pi}{N}nl} \sum_{k=0}^{N-1} e^{j\frac{2\pi}{N}(k-\frac{N}{2})n(1+\varepsilon)} R_k, \quad (5)$$

Taking the FFT shift performed through $(-1)^n$ multiplication into account, equation (5) can be manipulated to separate the desired (signal) component from the ICI component as:

$$Y_l = \sum_{n=0}^{N-1} R_l e^{j\frac{2\pi}{N}(l-\frac{N}{2})n\varepsilon} + \sum_{n=0}^{N-1}\sum_{\substack{k=0\\k\neq l}}^{N-1} e^{j\frac{2\pi}{N}n(k(1+\varepsilon)-l-\varepsilon\frac{N}{2})} R_k, \quad (6)$$

Equation (6) can be simplified using a finite geometric series as:

$$Y_l = R_l \frac{e^{j\pi\varepsilon(l-\frac{N}{2})}}{e^{j\frac{\pi}{N}\varepsilon(l-\frac{N}{2})}} \frac{\sin(\pi\varepsilon(l-\frac{N}{2}))}{N\sin(\frac{\pi}{N}\varepsilon(l-\frac{N}{2}))} + \quad (7)$$

$$\sum_{\substack{k=0\\k\neq l}}^{N-1} R_k \frac{e^{j\pi\varepsilon(k-\frac{N}{2})}}{e^{j\frac{\pi}{N}(\varepsilon(k-\frac{N}{2})+k-l)}} \frac{\sin(\pi\varepsilon(k-\frac{N}{2}))}{N\sin(\frac{\pi}{N}(\varepsilon(k-\frac{N}{2})+k-l))}$$

$$= R_l \frac{e^{j\pi\varepsilon(l-\frac{N}{2})}}{e^{j\frac{\pi}{N}\varepsilon(l-\frac{N}{2})}} \frac{\sin(\pi\varepsilon(l-\frac{N}{2}))}{N\sin(\frac{\pi}{N}\varepsilon(l-\frac{N}{2}))} +$$

$$\sum_{\substack{k=0\\k\neq l}}^{N-1} R_k \frac{e^{j\pi(\varepsilon(k-\frac{N}{2})+k-l)}}{e^{j\frac{\pi}{N}(\varepsilon(k-\frac{N}{2})+k-l)}} \frac{\sin(\pi(\varepsilon(k-\frac{N}{2})+k-l))}{N\sin(\frac{\pi}{N}(\varepsilon(k-\frac{N}{2})+k-l))}.$$

A Dirichlet function can be defined as $$diric_N(x) = \frac{\sin(N\pi x)}{N\sin(\pi x)}.$$

If $x \ll 1$, the Dirichlet can be expressed as:

$$diric_N(x) \approx \frac{\sin(N\pi x)}{N\pi x} = \text{sinc}(Nx). \quad (8)$$

Assuming $\varepsilon N \ll 1$ and neglecting the phase ramping term, the following equation can be derived using the Dirichlet function:

$$Y_l \approx R_l diric_N\left(\varepsilon\left(\frac{l}{N} - \frac{1}{2}\right)\right) + \quad (9)$$

$$\sum_{\substack{k=0\\k\neq l}}^{N-1} R_k e^{-j\frac{\pi}{N}(k-l)}(-1)^{k-l} diric_N\left(\varepsilon\left(\frac{k}{N} - \frac{1}{2}\right) + \frac{k-l}{N}\right).$$

The term in the summation can be defined as:

$$ICI_{k,l} = R_k e^{-j\frac{\pi}{N}(k-l)}(-1)^{k-l} diric_N\left(\varepsilon\left(\frac{k}{N} - \frac{1}{2}\right) + \frac{k-l}{N}\right). \quad (10)$$

As can be seen from equation (10), most of the ICI energy is concentrated at neighboring sub-carriers. Thus, $ICI_{k,l}$ can be approximated under the condition $|k-l| \ll N$ as follows:

$$ICI_{k,l} \approx R_k(-1)^{k-l}\text{sinc}\left(\varepsilon\left(k - \frac{N}{2}\right) + k - l\right) \quad (11)$$

$$= R_k(-1)^{k-l}\frac{\sin\pi\left(\varepsilon\left(k - \frac{N}{2}\right) + k - l\right)}{\pi\left(\varepsilon\left(k - \frac{N}{2}\right) + k - l\right)}$$

$$\approx R_k \frac{\pi\left(\varepsilon\left(k - \frac{N}{2}\right)\right)}{\pi(k-l)}$$

$$= R_k \frac{\varepsilon}{2} \frac{2k - N}{k - l}.$$

Next, the periodicity of $ICI_{k,l}$ is be examined. The following relationship can be defined due to its FFT nature:

$$R_k = R_{k+N} \quad (12)$$

Applying this definition, the following expression can be derived:

$$ICI_{k+N,l} = R_{k+N} e^{-j\frac{\pi}{N}(k+N-l)}(-1)^{k+N-l} diric_N \quad (13)$$

$$\left(\varepsilon\left(\frac{k+N}{N} - \frac{1}{2}\right) + \frac{k+N-l}{N}\right)$$

$$= R_k e^{-j\frac{\pi}{N}(k-l)}(-1)(-1)^{k-l}(-1)^N diric_N$$

$$\left(\varepsilon\left(\frac{k}{N} - \frac{1}{2}\right) + \frac{k-l}{N} + \varepsilon + 1\right)$$

$$= R_k e^{-j\frac{\pi}{N}(k-l)} diric_N\left(\varepsilon\left(\frac{k}{N} + \frac{1}{2}\right) + \frac{k-l}{N}\right),$$

where the following property of the Dirichlet function is used:

$$diric_N(x+1) = -diric_N(x) \quad (14).$$

As one can readily see, the $ICI_{k,l}$ term is not exactly periodic. However, if k and l are neighbor sub-carriers in the modulo-N sense (e.g., the two sub-carriers are located around the lowest frequency and the highest frequency respectively), the following approximation applies:

$$ICI_{k+N,l} \approx R_k e^{-j\frac{\pi}{N}(k-l)}(-1)^{k-l}\text{sinc}\left(\varepsilon\left(k + \frac{N}{2}\right) + k - l\right) \quad (15)$$

$$= R_k(-1)^{k-l}\frac{\sin\pi\left(\varepsilon\left(k + \frac{N}{2}\right) + k - l\right)}{\pi\left(\varepsilon\left(k + \frac{N}{2}\right) + k - l\right)}$$

$$\approx R_k \frac{\pi\left(\varepsilon\left(k + \frac{N}{2}\right)\right)}{\pi(k-l)}$$

$$= R_k \frac{\varepsilon}{2} \frac{2k + N}{k - l}$$

$$= R_k \frac{\varepsilon}{2} \frac{2(k+N) - N}{k - l},$$

Therefore, periodicity holds approximately in the wrap-around sense.

If the contribution from distant neighbor sub-carriers is neglected and only the Δ close neighbor sub-carriers are considered, where Δ<<N, the ICI-contaminated signal reduces to:

$$Y_l \approx R_l + \frac{\varepsilon}{2} \sum_{\substack{k=l-\Delta \\ k \neq l}}^{l+\Delta} \frac{\mod(2k-N, 2N)}{k-l} R_k. \quad (16)$$

Equation (16) can be equivalently represented as matrix operation.

$$\underbrace{\begin{bmatrix} Y_0 \\ Y_1 \\ Y_2 \\ \vdots \\ \vdots \\ \vdots \\ Y_{N-1} \end{bmatrix}}_{Y} \approx$$

$$\underbrace{\begin{bmatrix} R_0 \\ R_1 \\ R_2 \\ \vdots \\ \vdots \\ \vdots \\ R_{N-1} \end{bmatrix}}_{R} + \frac{\varepsilon}{2} \underbrace{\begin{bmatrix} 0 & 1 & 1/2 & 1/3 & \vdots & -1/3 & -1/2 & -1 \\ -1 & 0 & 1 & 1/2 & \vdots & & -1/3 & -1/2 \\ -1/2 & -1 & 0 & 1 & \vdots & \vdots & \vdots & -1/3 \\ -1/3 & -1/2 & -1 & \vdots & & & & \vdots \\ \vdots & \vdots & \vdots & \vdots & & \vdots & \vdots & 1/3 \\ 1/3 & \vdots & \vdots & \vdots & & & 1 & 1/2 \\ 1/2 & 1/3 & \vdots & \vdots & \vdots & -1 & 0 & 1 \\ 1 & 1/2 & 1/3 & \vdots & -1/3 & -1/2 & -1 & 0 \end{bmatrix}}_{\Psi}$$

$$\underbrace{\begin{bmatrix} Y_0 \\ Y_1 \\ Y_2 \\ \vdots \\ \vdots \\ \vdots \\ Y_{N-1} \end{bmatrix}}_{Y} \approx$$

$$\underbrace{\begin{bmatrix} R_0 \\ R_1 \\ R_2 \\ \vdots \\ \vdots \\ \vdots \\ R_{N-1} \end{bmatrix}}_{R} + \frac{\varepsilon}{2} \underbrace{\begin{bmatrix} 0 & 1 & 1/2 & 1/3 & \vdots & -1/3 & -1/2 & -1 \\ -1 & 0 & 1 & 1/2 & \vdots & & -1/3 & -1/2 \\ -1/2 & -1 & 0 & 1 & \vdots & \vdots & \vdots & -1/3 \\ -1/3 & -1/2 & -1 & \vdots & & & & \vdots \\ \vdots & \vdots & \vdots & \vdots & & \vdots & \vdots & 1/3 \\ 1/3 & \vdots & \vdots & \vdots & & & 1 & 1/2 \\ 1/2 & 1/3 & \vdots & \vdots & \vdots & -1 & 0 & 1 \\ 1 & 1/2 & 1/3 & \vdots & -1/3 & -1/2 & -1 & 0 \end{bmatrix}}_{\Psi}$$

$$\underbrace{\begin{bmatrix} -N & & & & & \\ & 2-N & & & & \\ & & 4-N & & & \\ & & & \ddots & & \\ & & & & \ddots & \\ & & & & & N-4 \\ & & & & & & N-2 \end{bmatrix}}_{\Omega} \underbrace{\begin{bmatrix} R_0 \\ R_1 \\ R_2 \\ \vdots \\ \vdots \\ \vdots \\ R_{N-1} \end{bmatrix}}_{R}$$

where Ψ is Toeplitz by definition.

One can readily see from the above matrices that the sampling frequency error impacts the sub-carriers in the edges of the band most because the energy of the scaling matrix Ω concentrates on the outer diagonal taps. The edge-bands can be selectively treated by clasping the above matrices such that only ICI for the E lowest-frequency sub-carriers and the E highest-frequency sub-carriers are reduced, where E<N. The scaling matrix Ω can be reduced to a scalar N while flipping the sign of the top part of R in the second term, i.e.:

$$\underbrace{\begin{bmatrix} -1 & & & & & \\ & -1 & & & & \\ & & -1 & & & \\ & & & \ddots & & \\ & & & & \ddots & \\ & & & & & 1 \\ & & & & & & 1 \\ & & & & & & & 1 \end{bmatrix}}_{\Omega} \underbrace{\begin{bmatrix} R_0 \\ R_1 \\ R_2 \\ \vdots \\ \vdots \\ \vdots \\ R_{N-1} \end{bmatrix}}_{R}$$

In this simplified model, the term $$\frac{\varepsilon N}{2}$$

determines the ICI around the lowest and the highest frequency sub-carriers. Because the impact of ICI is most significant in this region, η can be set to $$\frac{\varepsilon N}{2}.$$

Alternatively, η can be set to $$\frac{\varepsilon(N-E)}{2}$$

to improve the accuracy of the ICI reduction algorithm in the middle of the edge-bands.

The phase ramping term that has been neglected will now be addressed. With this term, the ICI-contaminated signal is expressed as:

$$Y_l \approx R_l e^{j\pi\varepsilon(l-\frac{N}{2})} + \frac{\varepsilon}{2} \sum_{\substack{k=l-\Delta \\ k \neq l}}^{l+\Delta} \frac{mod(2k-N, 2N)}{k-l} e^{j\pi\varepsilon(k-\frac{N}{2})} R_k. \quad (17)$$

Defining $$R'_l = R_l e^{j\pi\varepsilon(l-\frac{N}{2})},$$

the following relationship still holds:

$$Y = R' + \eta \Psi \Omega R' \quad (18).$$

Figure 3:
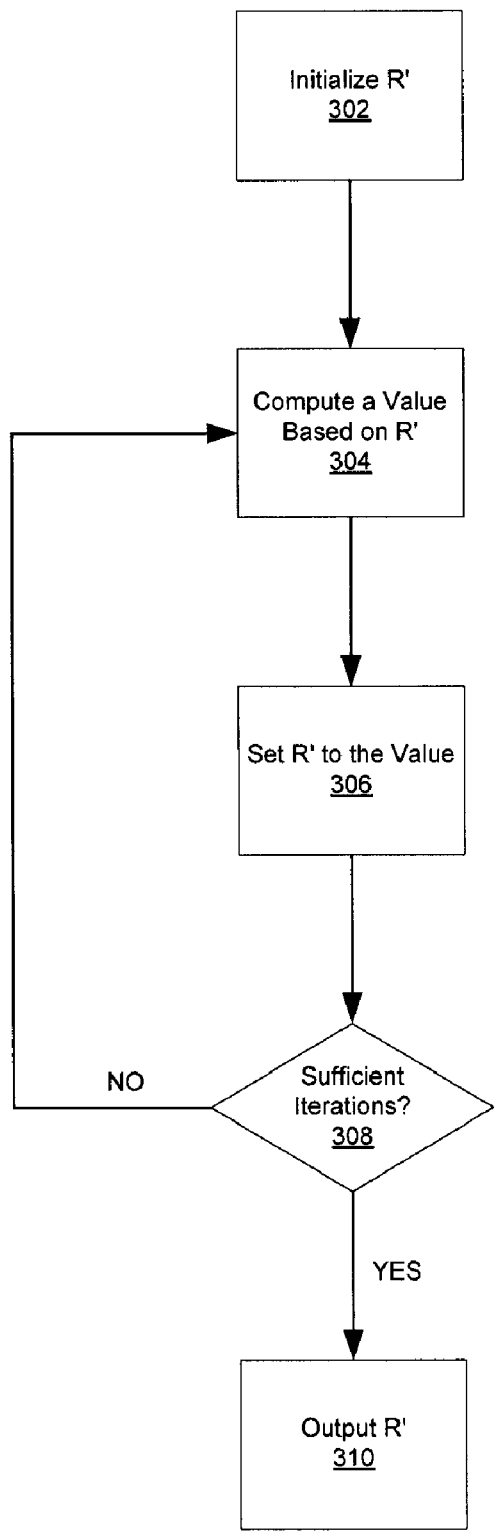
FIG. 3 is a flow diagram illustrating an example of an algorithm using an iterative process to cancel inter-carrier interference (ICI)

An iterative process using equation (18) may be used to reduce ICI in the edge-bands of an OFDM symbol Y in the frequency domain. An example of this process will be presented with reference to FIG. 3. In step 302, the iterative process is initialized by setting R' to Y. Next, one iteration of R' is performed using equation (18). Specifically, a value is computed for Y−η$\Psi\Omega$R' in step 304 and then R' is reset to that value in step 306. The algorithm then determines, in step 308, whether a sufficient number of iterations has been performed. Typically, one iteration should be sufficient, but a further reduction in ICI may be obtained with additional iterations. Those skilled in the art will readily be able to assess whether multiple iterations are required to meet the performance requirements for any particular application. If another iteration of R' is required, then the algorithm loops back to step 304. The process continues until a sufficient number of iterations has been performed on R', at which point the algorithm exits the loop and outputs R' in step 310. Once this occurs, $R_l$ may be computed from the following formula:

$$R_l = R'_l e^{-j\pi\varepsilon(l-\frac{N}{2})}. \quad (19)$$

The algorithm may be performed on each sub-carrier of the OFDM symbol, or alternatively, on the sub-carriers in the edge-bands (i.e., the E lowest frequency sub-carriers and the E highest frequency sub-carriers). The number of sub-carriers in the edge-bands may be readily determined by those skilled in the art based on the specific application and the overall design constraints imposed on the system. By way of example, the number of sub-carriers in the edge-bands can be determined by calculating the signal-to-noise ratio (SNR) of the sub-carriers and adjusting the edge-bands to include enough sub-carriers to meet the SNR requirements of the system.

Returning to FIG. 2, the output from the ICI canceller 214 $R_l$ is provided to the RX data processor 216. Referring to equations (2) and (3), the RX data processor 216 can recover the transmitted data/pilot/zero symbol $b_k$ from $R_k$ using the channel impulse response $H_k$ provided by the channel estimator 218.

Figure 4:
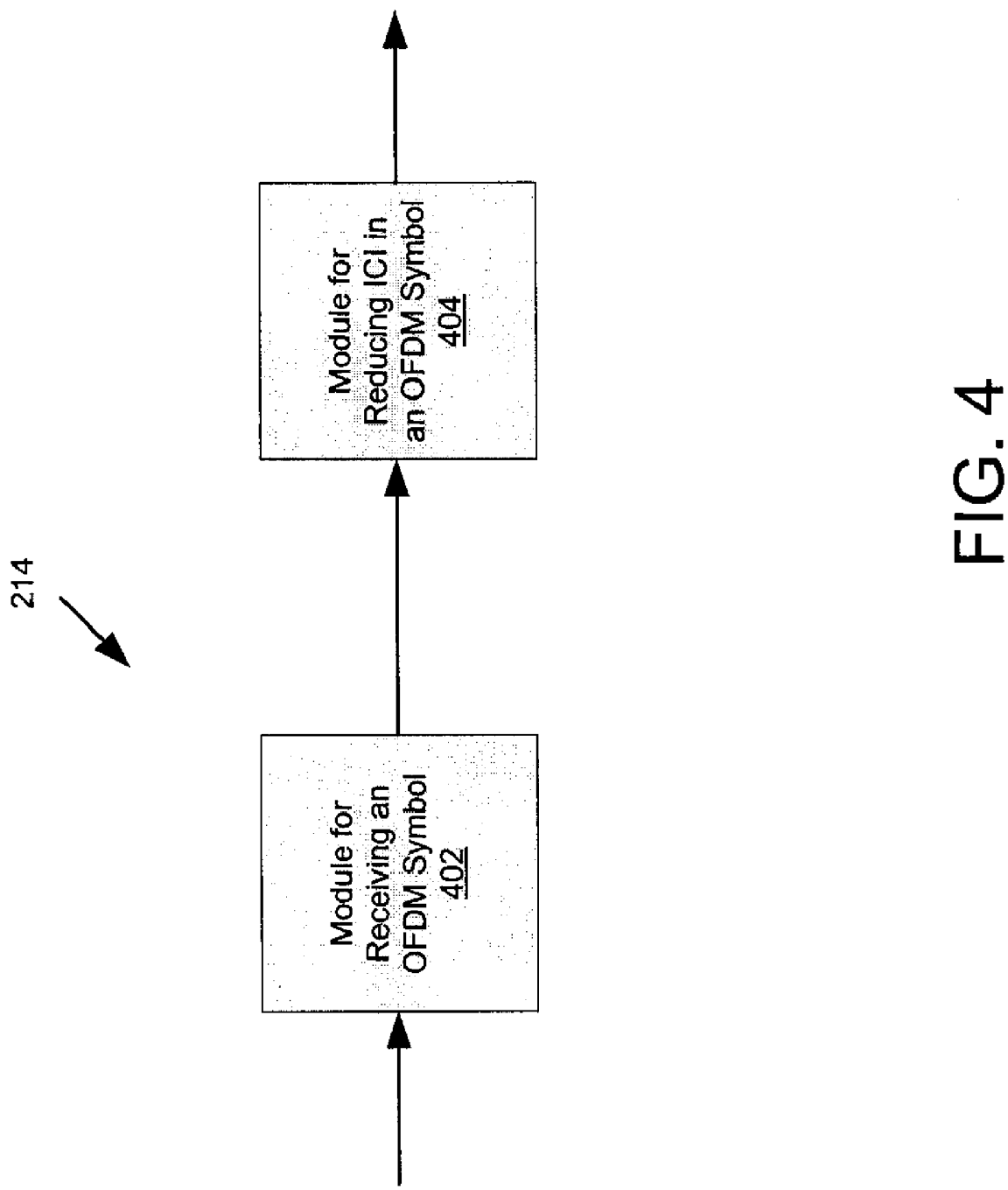
FIG. 4 is a functional block diagram of an ICI canceller.

FIG. 4 is a functional block diagram of an (ICI) canceller. The ICI canceller 132 includes a module 402 for receiving an OFDM symbol in the frequency domain, and a module 304 for reducing ICI in the OFDM symbol in the frequency domain.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in software executed by a processor, or in a combination of the two. The software may reside in computer-readable. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store software in the form of instructions or data structures and that can be accessed by a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
a canceller configured to reduce inter-carrier interference (ICI) in the frequency domain between a plurality of sub-carriers associated with an Orthogonal Frequency Division Multiplexing (OFDM) symbol by performing an iterative process on each of one or more of selected sub-carriers by:

initializing R' to the OFDM symbols carried by a sub-carrier;

and setting R' to a value computed as a function of R' using the following formula:

$$R'=Y-\eta\psi\Omega R',$$

where Y represents an OFDM symbol in the frequency domain,

η represents one of εN/2 or ε(N-E)/2 with ε corresponding to a frequency error, N corresponding to the number of the plurality of sub-carriers, and E indicating a number of subcarriers in an edge-band, ψ represents a Toeplitz matrix, and Ω represents a scaling matrix; and wherein R' is used to recover a transmitted data/pilot/zero symbol on a sub-carrier.

2. The receiver of claim 1 wherein the sub-carriers are distributed over a spectrum having a mid-band and two edge-bands, and wherein the sub-carriers are limited to the sub-carriers in the edge-bands.

3. The receiver of claim 2 wherein the one or more of the sub-carries include all of the sub-carriers carrying non-zero symbols in the edge-bands.

4. The receiver of claim 3 wherein the canceller is further configured to determine the number of the sub-carriers in each of the edge-bands.

5. The receiver of claim 1 wherein the canceller is further configured to determine the number of iterations to be performed on each of the selected sub-carriers.

6. The receiver of claim 1 further comprising a Fast Fourier Transform configured to convert the OFDM symbol from the time domain to the frequency domain.

7. The receiver of claim 6 wherein the OFDM symbol is received over a radio channel, and wherein the receiver further comprises a processor configured to recover data from the OFDM symbol output from the canceller and an estimate of the radio channel's impulse response.

8. The receiver of claim 1 wherein the ICI is caused by sampling clock error for the OFDM symbol.

9. An inter-carrier interference (ICI) canceller, comprising:

means for receiving an Orthogonal Frequency Division Multiplexing (OFDM) symbol in the frequency domain; and means for reducing ICI in the frequency domain between a plurality of sub-carriers associated with said OFDM symbol, wherein means for reducing ICI comprises means for performing an iterative process on each of one or more selected sub-carriers by:

initializing R' to the OFDM symbols carried by a sub-carrier; and setting R' to a value computed as a function of R' using the following formula:

$$R'=Y-\eta\psi\Omega R',$$

where Y represents an OFDM symbol in the frequency domain,

η represents one of εN/2 or ε(N-E)/2 with ε corresponding to a frequency error, N corresponding to the number of the plurality of sub-carriers, and E indicating a number of subcarriers in an edge-band, ψ represents a Toeplitz matrix, and Ω represents a scaling matrix; and wherein R' is used to recover a transmitted data/pilot/zero symbol on a sub-carrier.

10. The ICI canceller of claim 9 wherein the sub-carriers are distributed over a spectrum having a mid-band and two edge-bands, and wherein the sub-carriers are limited to the sub-carriers in the edge-bands.

11. The ICI canceller of claim 10 wherein the one or more of the sub-carriers include all of the sub-carriers carrying non-zero symbols in the edge-bands.

12. The ICI canceller of claim 11 further comprising means for determining the number of the sub-carriers in each of the edge-bands.

13. The ICI canceller of claim 9 further comprising means for determining the number of iterations to be performed on each of the sub-carriers.

14. The ICI canceller of claim 9 wherein the ICI is caused by sampling clock error for the OFDM symbol.

15. A method of receiving communications, comprising:

receiving an Orthogonal Frequency Division Multiplexing (OFDM) symbol in the frequency domain; and reducing inter-carrier interference (ICI) in the frequency domain between a plurality of sub-carriers associated with said OFDM symbol, wherein reducing inter-carrier interference (ICI) in the frequency domain comprises performing an iterative process on each of one or more selected the sub-carriers by:

initializing R' to the OFDM symbols carried by a sub-carrier; and setting R' to a value computed as a function of R' using the following formula:

$$R'=Y-\eta\psi\Omega R',$$

where Y represents an OFDM symbol in the frequency domain,

η represents one of εN/2 or ε(N-E)/2 with ε corresponding to a frequency error, N corresponding to the number of the plurality of sub-carriers, and E indicating a number of subcarriers in an edge-band, ψ represents a Toeplitz matrix, and Ω represents a scaling matrix; and wherein R' is used to recover a transmitted data/pilot/zero symbol on a sub-carrier.

16. The method of claim 15 wherein the sub-carriers are distributed over a spectrum having a mid-band and two edge-bands, and wherein the sub-carriers are limited to the sub-carriers in the edge-bands.

17. The method of claim 16 wherein the one or more of the sub-carriers include all of the sub-carriers carrying non-zero symbols in the edge-bands.

18. The method of claim 17 further comprising determining the number of the sub-carriers in each of the edge-bands.

19. The method of claim 15 further comprising determining the number of iterations to be performed on each of the sub-carriers.

20. The method receiver of claim 15 wherein the ICI is caused by sampling clock error for OFDM symbol.

21. Non-transitory computer readable media encoded with a set of instructions for a processor to cancel inter-carrier interference (ICI), the instructions comprising:

code to receive an Orthogonal Frequency Division Multiplexing (OFDM) symbol in the frequency domain; and code to reduce ICI in the frequency domain between a plurality of sub-carriers associated with said OFDM symbol, wherein the code to reduce ICI performs an iterative process on each of one or more selected sub-carriers by:

initializing R' to the OFDM symbols carried by a sub-carrier; and setting R' to a value computed as a function of R' using the following formula:

$$R' = Y - \eta\psi\Omega R',$$

where Y represents an OFDM symbol in the frequency domain,

η represents one of εN/2 or ε(N-E)/2 with ε corresponding to a frequency error, N corresponding to the number of the plurality of sub-carriers, and E indicating a number of subcarriers in an edge-band, ψ represents a Toeplitz matrix, and Ω represents a scaling matrix; and wherein R' is used to recover a transmitted data/pilot/zero symbol on a sub-carrier.

* * * * *